Figure 1:
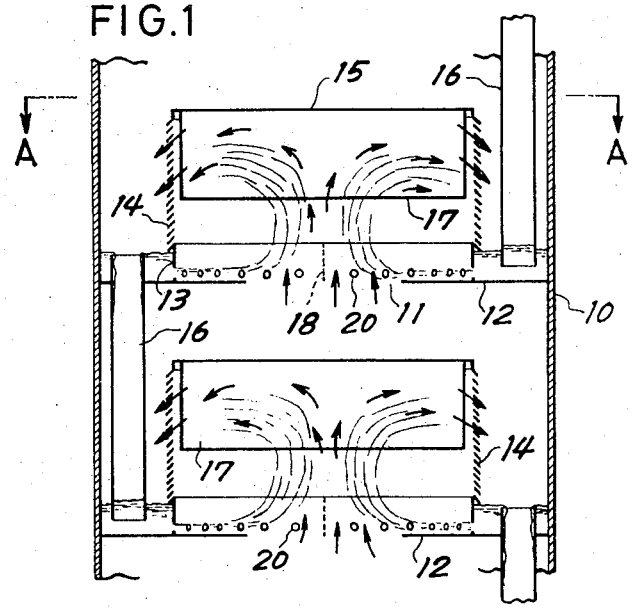

United States Patent [19]
Tanigawa et al.

[11] 3,779,527
[45] Dec. 18, 1973

[54] GAS-LIQUID CONTACTING APPARATUS

[75] Inventors: Shogo Tanigawa; Takesi Yokoyama, both of Tamano; Kouichi Karakawa, Toyama, all of Japan

[73] Assignee: Mitsui Shipbuilding and Engineering Co. Ltd., Tokyo, Japan

[22] Filed: Aug. 24, 1971

[21] Appl. No.: 174,450

[30] Foreign Application Priority Data
Aug. 29, 1970 Japan .................. 45/86432

[52] U.S. Cl. .......................... 261/114 R, 55/257
[51] Int. Cl. ................................ B01d 3/26
[58] Field of Search ............... 55/223, 240, 257, 55/255, 256; 261/114 R, 114 A, 114 VT, 114 JP, 113

[56] References Cited
UNITED STATES PATENTS

| | | | |
|---|---|---|---|
| 410,634 | 9/1889 | Bolton | 261/114 R |
| 2,819,049 | 1/1958 | Manning, Jr. et al | 261/114 A |
| 3,624,696 | 11/1971 | Flushing et al. | 55/223 |
| 3,633,882 | 1/1972 | Karakawa et al. | 261/114 R |

*Primary Examiner*—Tim R. Miles
*Assistant Examiner*—Steven H. Markowitz
*Attorney*—Howson and Howson

[57] ABSTRACT

A gas-liquid contacting apparatus provided with vertically spaced trays having gas flow aperture therein and a contacting structure provided on the trays surrounding the gas flow aperture. The contacting structure has a cover for preventing gas and liquid from ascending and a perforated cylinder whose perforations are outwardly and downwardly directed.

3 Claims, 2 Drawing Figures

GAS-LIQUID CONTACTING APPARATUS

The present invention relates to a gas-liquid contacting apparatus for heat or mass transfer such as distillation apparatus or absorption apparatus in the chemical industry.

An object of the present invention is to provide a gas-liquid contacting apparatus in which liquid may be definitely separated from gas after contacting, so that entrainment of liquid may be prevented.

To this end, the gas-liquid contacting apparatus in accordance with the present invention comprises a gas-liquid contacting structure provided with perforated cylinder whose perforations are outwardly and downwardly directed, through which gas-liquid mixing flow passes and thereby liquid being separated from gas.

Figure 2:
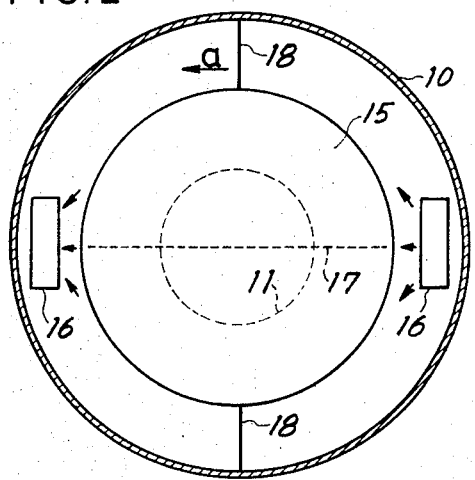

In the drawings;

FIG. 1 is a vertical sectional view of one embodiment of the present invention; and FIG. 2 is a sectional view taken on line A—A in FIG. 1.

Referring to the drawings, trays 12 each having an aperture or gas flow opening 11 at a central portion thereof are provided in a column 10 at a suitable spacing. Each tray 12 is provided with a gas-liquid contacting structure. The gas-liquid contacting structure comprises a cylindrical weir plate or wall 13 surrounding the aperture or gas flow opening 11 and having a plurality of apertures or passages 20, a perforated cylinder 14 secured to the weir plate 13, and a cover 15. The perforated cylinder 14 is formed to have outwardly and downwardly directed perforations.

Each tray 12 is also provided with a downcomer 16 at the outside of the structure, the downcomer projecting upwardly from the tray to maintain liquid thereon at a predetermined depth, and the lower end of the downcomer being near the lower tray. The downcomers are arranged in alternately diametrically opposite positions at every tray level. In the gas-liquid contacting structure, a partition plate 17 is provided along the flowing direction of the liquid on the tray indicated by the arrow "a" in FIG. 2. Weir plates 18 are secured on the tray at a right angles with the flowing direction.

Liquid on the upper tray 12 overflows the weir formed by the upper end of the dowmcomer 16 and flows down along the inside wall thereof. Liquid is maintained on the lower tray at a level determined by height of the weir, passes through the apertures or passages 20 of the cylindrical weir plate or wall 13 to the inside of the contacting structure and flows toward the gas flow opening 11 of the tray by the head of liquid on the tray. Liquid having passed over the edge of the opening 11 is blown up by ascending gas through the opening without falling down through the opening. Thus the liquid and gas are formed into the gas-liquid mixing flow. The gas-liquid mixing flow ascends and is diverted by the cover 15. Thereby the gas-liquid mixing flow flows from the structure through the perforated cylinder 14. The downwardly directed perforations of the perforated cylinder guide the liquid in the outwardly flowing mixture to flow down so that efficient separation of liquid from gas takes place. Liquid separated from the flow falls on the pool maintained on the tray and gas ascends to the next upper contacting structure. Thus the liquid is circulated and repeatedly contacts with gas. The weir plates 18 prevent the liquid from flowing without entering into the contacting structure. More specifically, liquid fallen on the tray from the upper tray firstly enters into the contacting structure in which contacts with gas, thereafter flows out of the structure and falls on the tray. After which the liquid flows downstream, overflows the weir plate 18, and enters into the structure to contact with gas. Thus liquid contacts with gas at least two times on one tray.

From the foregoing, it will be observed that efficient separation of liquid may be performed because gas-liquid mixing flow passes through downward perforations after contacting, so that entrainment of liquid is reliably prevented to increase contact efficiency.

We claim:

1. A gas-liquid contacting apparatus comprising an upright column in which the gas flows upwardly, at least one tray mounted transversely in said column and having means for maintaining liquid thereon at a predetermined depth and a gas-flow opening therein, upwardly through which the gas is adapted to flow, contacting structure surrounding said opening comprising a cylindrical wall projecting upwardly from said tray and having passages below said predetermined depth of liquid to permit discharge of the liquid from the tray therethrough, a cylinder mounted coaxially on said cylindrical wall having outwardly and downwardly directed perforations above said predetermined depth to permit gas to flow outwardly and downwardly therethrough, and a cover on said perforated cylinder, said structure being designed so that the liquid from said tray discharged through said passages is blown up by the gas ascending through the gas-flow opening of the tray, the desired gas-liquid contact being effected within said perforated cylinder above said wall, and separation of the liquid from the gas being effected by the downward and outward flow through said perforations.

2. A gas-liquid contacting apparatus according to claim 1 wherein said cylinder is perforated throughout its height.

3. A gas-liquid contacting apparatus according to claim 1 including a series of trays mounted transversely in said column in vertically-spaced relation, said means for maintaining the liquid at a predetermined level upon each tray including downcomer means to transfer liquid from an upper tray to the next lower tray and arranged so that the gas does not flow upwardly through said downcomer means, said downcomer means for the next lower tray being positioned at the opposite side of the column from the downcomer means for the upper tray, whereby the liquid is directed to flow across said tray from said upper downcomer means to said next downcomer means, and a vertical weir plate disposed transversely to said flow intermediate said cylinder wall and the side of said column.

* * * * *